United States Patent
Shimada et al.

(10) Patent No.: US 8,767,819 B2
(45) Date of Patent: Jul. 1, 2014

(54) MOVING PICTURE ENCODING APPARATUS

(75) Inventors: Satoshi Shimada, Kawasaki (JP); Akira Nakagawa, Kawasaki (JP); Akihiro Yamori, Kawasaki (JP); Noriaki Tsukuda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 864 days.

(21) Appl. No.: 12/407,924

(22) Filed: Mar. 20, 2009

(65) Prior Publication Data
US 2009/0190655 A1 Jul. 30, 2009

Related U.S. Application Data

(63) Continuation of application No. PCT/JP2006/319578, filed on Sep. 29, 2006.

(51) Int. Cl.
*H04N 7/12* (2006.01)
(52) U.S. Cl.
USPC .................................................. 375/240.01
(58) Field of Classification Search
USPC ........................................ 375/240.01, 240.28
IPC ........................................................ H04N 7/12
See application file for complete search history.

(56) References Cited

U.S. PATENT DOCUMENTS

| | | |
|---|---|---|
| 5,121,202 A | 6/1992 | Tanoi |
| 6,157,675 A | 12/2000 | Mitsuhashi et al. |
| 6,683,987 B1 | 1/2004 | Sugahara |
| 8,194,751 B2 | 6/2012 | Notoya et al. |
| 2002/0025000 A1 | 2/2002 | Takeuchi et al. |
| 2002/0028061 A1* | 3/2002 | Takeuchi et al. ........ 386/68 |

FOREIGN PATENT DOCUMENTS

| | | |
|---|---|---|
| JP | 3-6184 A | 1/1991 |
| JP | 10-042295 | 2/1998 |
| JP | 10-336670 A | 12/1998 |
| JP | 11-177986 | 7/1999 |
| JP | 2000-032448 | 1/2000 |
| JP | 2000-278692 | 10/2000 |
| JP | 2001-8212 A | 1/2001 |
| JP | 2001-326940 | 11/2001 |
| JP | 2002-27469 A | 1/2002 |
| JP | 2002-281508 | 9/2002 |
| JP | 2002-330441 A | 11/2002 |
| JP | 2004-274732 A | 9/2004 |

OTHER PUBLICATIONS

Joint Video Team (JVT) of ISO/IEC MPEG and ITU-T VCEG, Document JVT-C167, 3rd Meeting: Fairfax, Virginia, USA, May 6-10, 2002.*

(Continued)

*Primary Examiner* — Gims Philippe
(74) *Attorney, Agent, or Firm* — Fujitsu Patent Center

(57) ABSTRACT

An encoding circuit (1) encodes an input image. A thinning-out decision unit (2) determines whether or not a picture needs to be thinned out. A dummy picture storage device (4) stores a dummy picture. A dummy picture is encoded data in which all the blocks refer to the same picture, motion vectors of all the blocks are zero, and none of the blocks has prediction residual information. A reference picture selection unit (5) selects a reference picture from among a plurality of referenceable pictures. A header generating unit (7) generates a header to be added to a dummy picture. In the header, the selected reference picture is assigned to an index specifying a reference picture for the dummy picture.

10 Claims, 19 Drawing Sheets

(56) References Cited

OTHER PUBLICATIONS

International Search Report for PCT/JP2006/319578, mailed Dec. 19, 2006.
Japanese Office Action mailed Nov. 15, 2011 issued in corresponding Japanese Patent Application No. 2008-537357.
Partial translation of Japanese Laid-Open Patent Application 10-42295 (Reference AJ in the IDS filed Mar. 20, 2009).
Japanese Office Action mailed Aug. 7, 2012 for corresponding Japanese Application No. 2008-537357, with Partial English-language Translation.

* cited by examiner

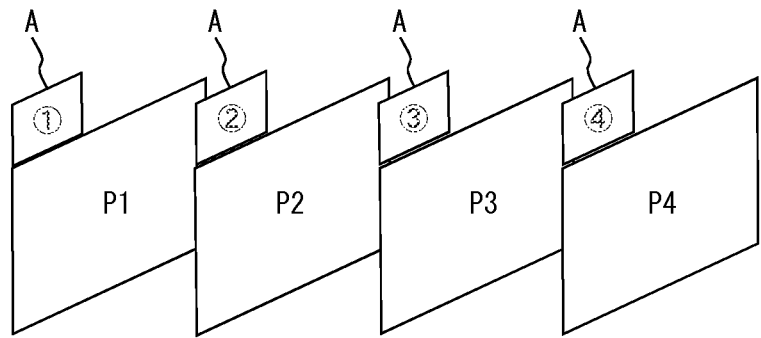
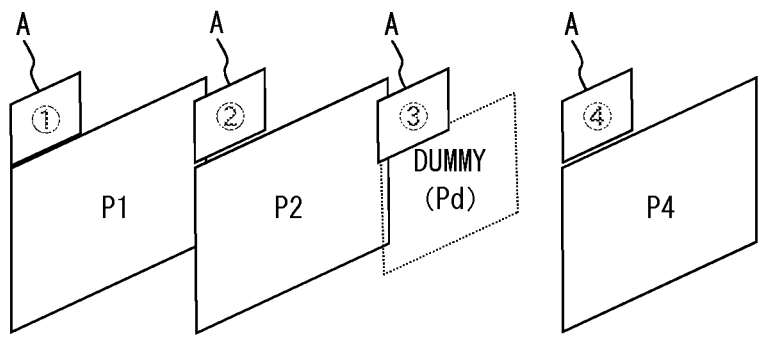
Related Art
FIG. 1

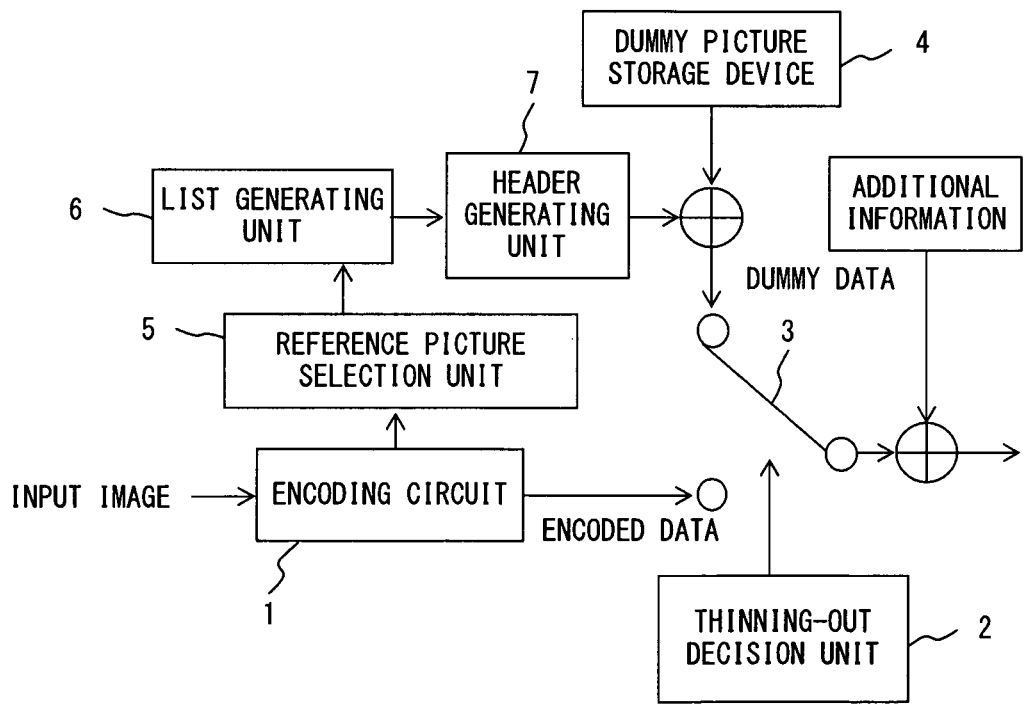
F I G. 3

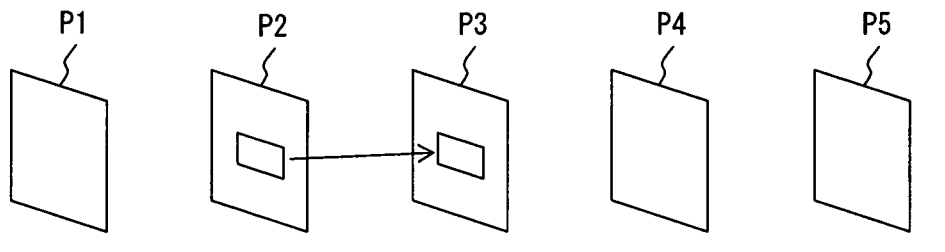
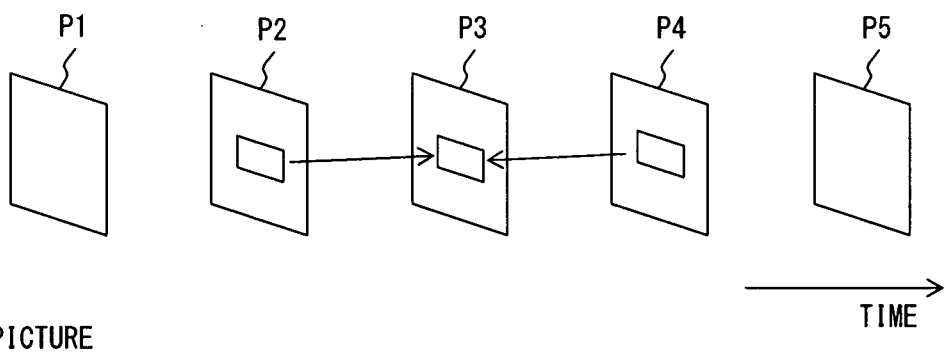
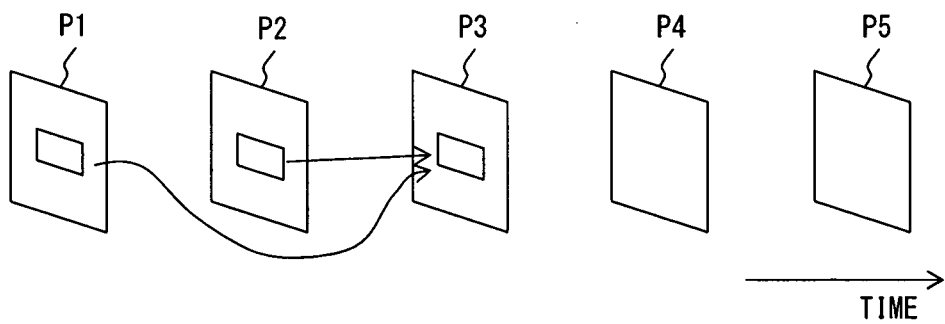
FIG. 5

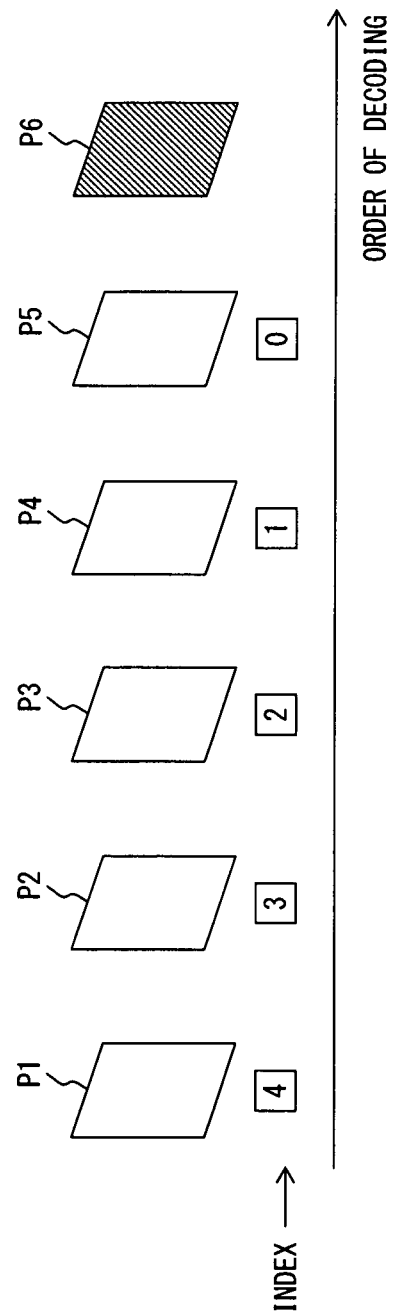
F I G. 6A

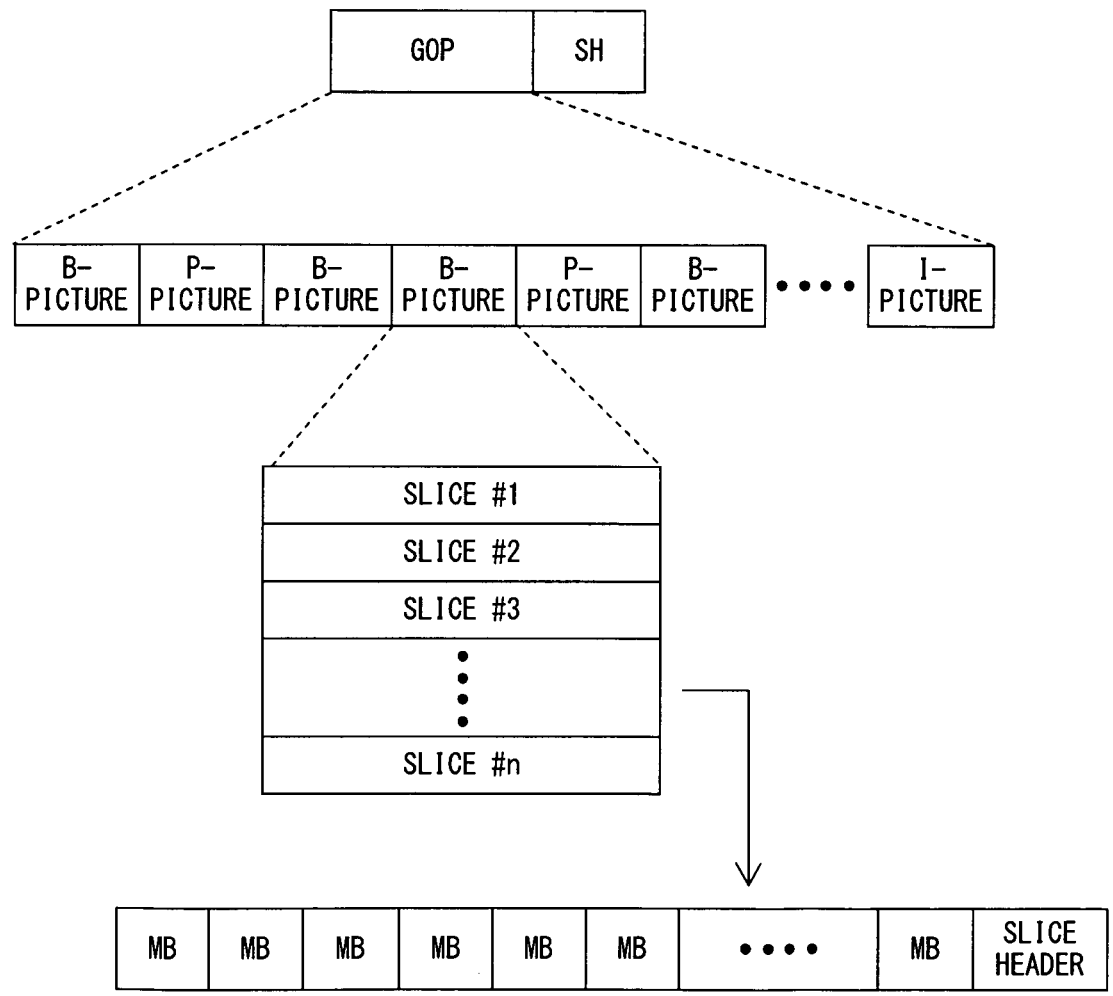
F I G. 7

| SKIP FLAG | MB TYPE | REFERENCE PICTURE INDEX 0 | REFERENCE PICTURE INDEX 1 | MOTION VECTOR 0 | MOTION VECTOR 1 | CBP | DCT COEFFICIENT |
|---|---|---|---|---|---|---|---|

F I G. 8

|  | MB TYPE | REFERENCE PICTURE INDEX | MOTION VECTOR | CBP |
|---|---|---|---|---|
| MB#1 | 0 | 0 | 0 | 0000 |
| MB#2 | 0 | 0 | 0 | 0000 |
| MB#3 | 0 | 0 | 0 | 0000 |
| ⋮ | | ⋮ | | |
| MB#k | 0 | 0 | 0 | 0000 |

F I G. 9 A

| | MB TYPE | REFERENCE PICTURE INDEX (L0) | MOTION VECTOR | CBP |
|---|---|---|---|---|
| MB#1 | 1 | 0 | 0 | 0000 |
| MB#2 | 1 | 0 | 0 | 0000 |
| MB#3 | 1 | 0 | 0 | 0000 |
| ⋮ | | ⋮ | ⋮ | |
| MB#k | 1 | 0 | 0 | 0000 |

F I G. 9 B

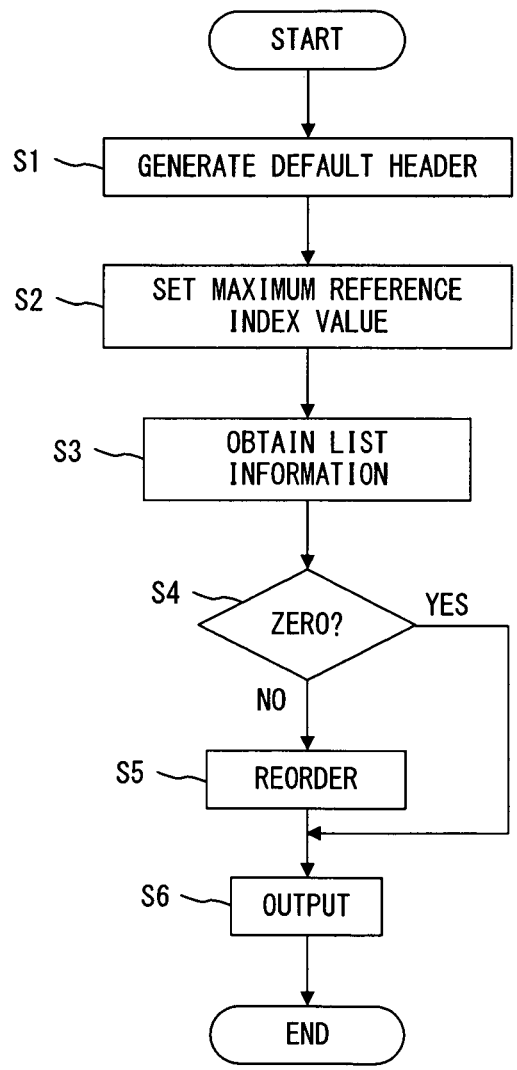
F I G. 10

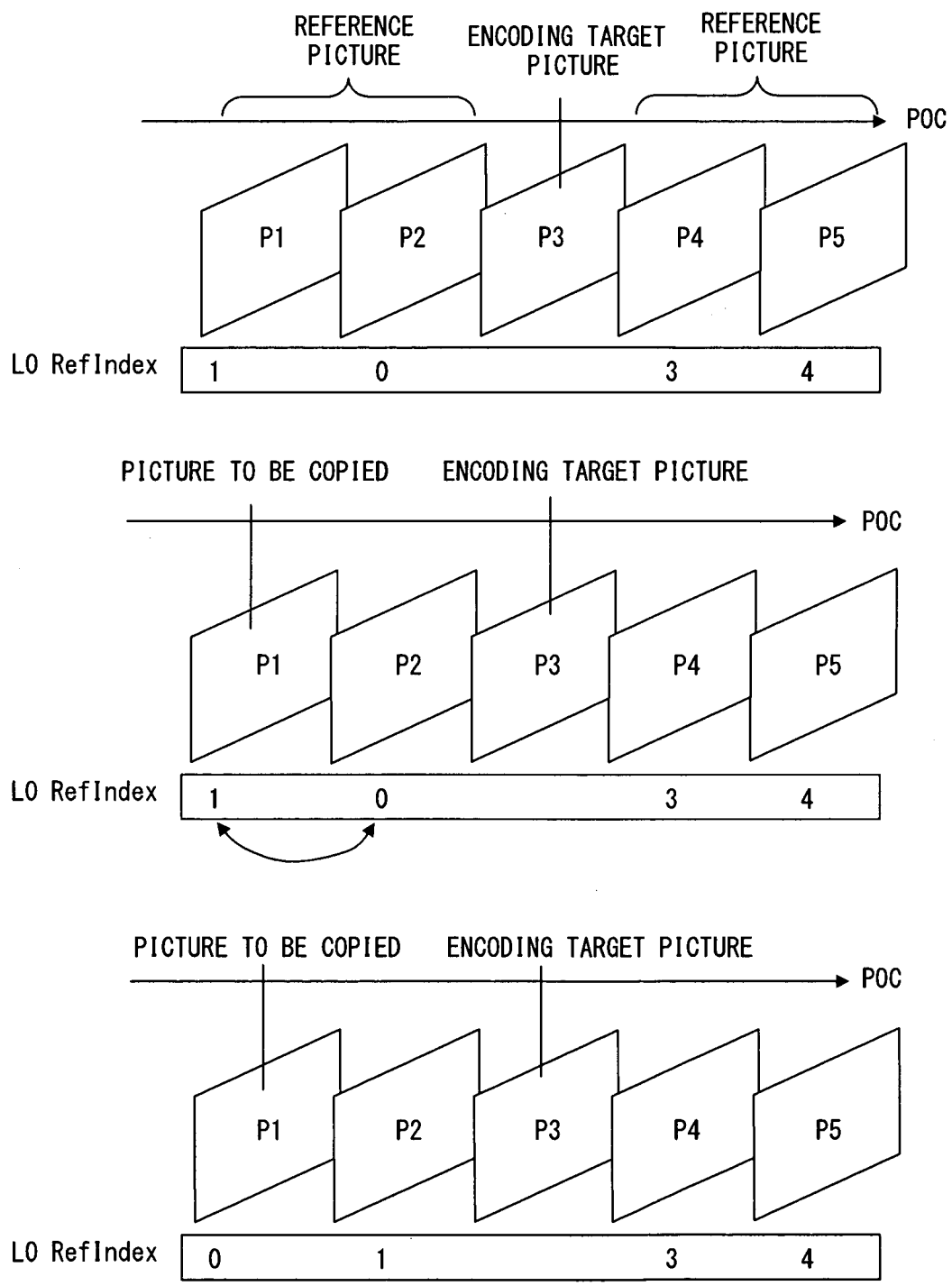
F I G. 1 1

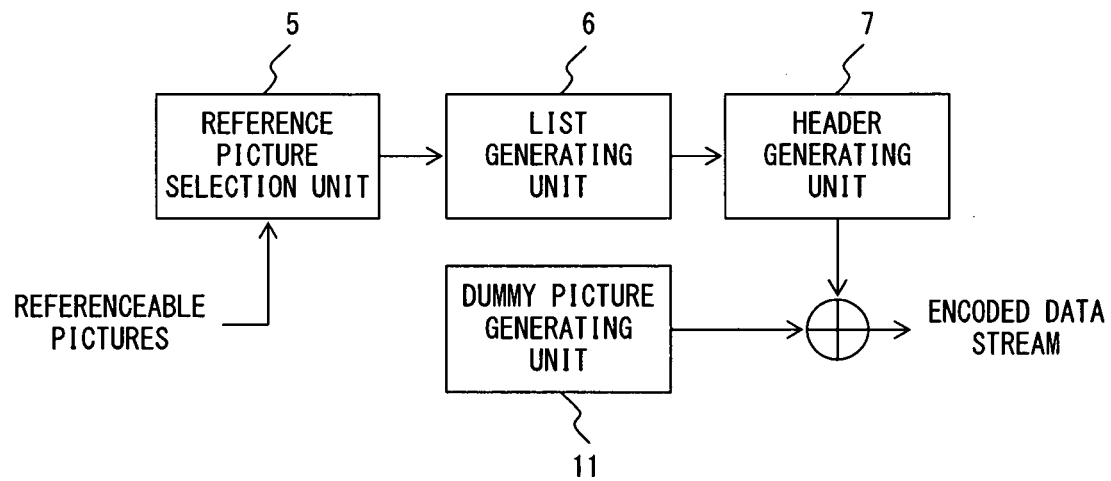
F I G. 13

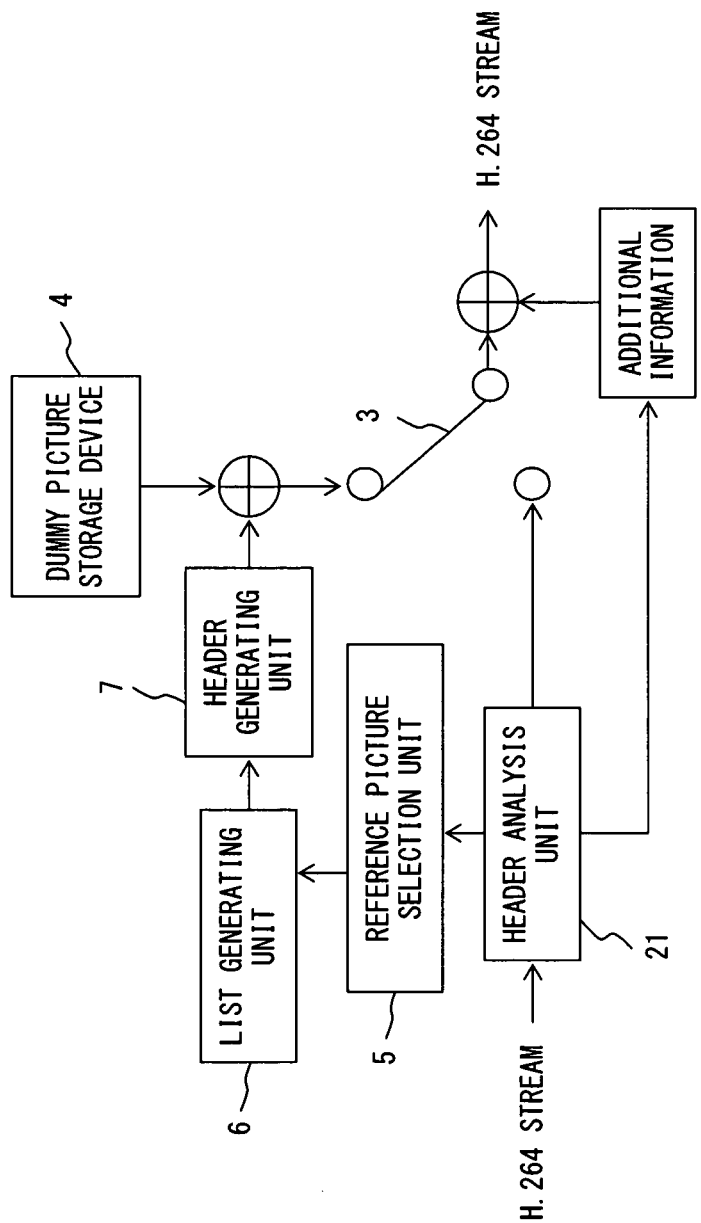
F I G. 1 6

MOVING PICTURE ENCODING APPARATUS

CROSS REFERENCE TO RELATED APPLICATIONS

This application is a continuation application, filed under 35 U.S.C. §111(a), of International Application PCT/JP2006/319578, filed Sep. 29, 2006 in Japan, which designated the United States, the contents of International Application PCT/JP2006/319578 are incorporated herein by reference.

FIELD OF THE INVENTION

The present invention relates to an apparatus that encodes a moving picture, and particularly to a technique of thinning out a picture in a moving picture encoding process utilizing motion compensation.

BACKGROUND ART

When the bit rate of moving picture information to be transmitted exceeds the capacity of a transmission system, pictures (or frames) have to be thinned out. That is, frames have to be skipped. This necessity arises also when the amount of processing for real-time encoding exceeds the capacity of an encoding apparatus.

Also, additional information such as character information is sometimes transmitted together with moving picture information. For example, character information for a news bulletin is sometimes transmitted while information for a TV program is being transmitted. Such additional information is basically transmitted in association with the corresponding pictures. In the example illustrated in FIG. 1, additional information A is added respectively to consecutive pictures P1 through P4.

When additional information is transmitted together with moving picture information, since the additional information is transmitted in association with the corresponding pictures as described above, it is not preferable to thin out a picture with additional information. Thus, when a picture with additional information is to be thinned out, a dummy picture has to be inserted in place of the thinned out picture. In the example illustrated in FIG. 1, picture P3 is thinned out and a dummy picture Pd is inserted in place of picture P3. Additional information A is added respectively to pictures P1, P2, Pd, and P4 and transmitted. In addition, the amount of information of a dummy picture is desirably as small as possible. Further, the amount of processing that has to be performed by an encoding apparatus to generate a dummy picture is also desirably as small as possible.

Newer moving picture encoding apparatuses are usually equipped with a function of compressing information by referring to a different picture in order to encode data of each picture. This function includes a process of generating encoded data from motion information and an error between an encoding target picture and a reference picture. Accordingly, when a target picture refers to another picture, the encoded data of the target picture includes information used for identifying the reference picture. Thus, when a target picture referring to another picture is replaced with a dummy picture, the encoded data of that dummy picture also needs to include information for identifying the reference picture.

In conventional moving picture encoding methods such as MPEG2, the degree of freedom for reference pictures is low (only a small number of pictures can be referred to), and accordingly the relationship between an encoding target picture and a reference picture is simple. Thus, in a configuration that dummy data is prepared in advance for thinned-out pictures, the number of dummy pictures is small.

However, in H.264, which provides an encoding efficiency higher than MPEG2, the degree of freedom for reference pictures is high (a greater number of pictures can be referred to). Also, H.264 permits each of the blocks constituting a picture to refer to one or a plurality of different pictures. Therefore, a greater number of dummy pictures are required in a configuration that prepares dummy pictures in advance for thinned-out pictures. Specifically, as many pieces of different dummy data have to be prepared as referenceable pictures. Accordingly, when dummy pictures are prepared in advance and stored in a memory area, the memory area becomes large. In the example illustrated in FIG. 2, dummy pictures d1, d2, d3, . . . are stored in a memory area, and dummy picture d2 is read out and used.

As a related art, Patent Document 1 discloses an image encoded-data generating apparatus that thins out frames according to the content of an image. This apparatus has a function of dividing encoded data in frames into encoded data of image areas and encoded data of caption areas, and merging the encoded data of image areas with the encoded data of caption areas after thinning out the encoded data of image areas.

As another related art, Patent Document 2 discloses a method for detecting an area not having information to be encoded in order to reduce the total amount of information to be encoded.

Patent Document 1: Japanese Laid-open Patent Publication No. 2000-32448

Patent Document 2: Japanese Laid-open Patent Publication No. 2002-281508

DISCLOSURE OF THE INVENTION

It is an object of the present invention to enable a dummy picture inserted in place of a thinned out picture to refer to a desired picture while suppressing the amount of information of encoded data in a moving picture encoding apparatus that encodes a moving picture utilizing motion compensation.

A moving picture encoding apparatus of the invention encodes a moving picture utilizing motion compensation and includes: storage means for storing encoded data of a dummy picture in which each block refers to the same picture; selection means for selecting a picture to be referred to by the dummy picture; header generating means for generating a header including information representing a correspondence relationship between a picture referred to by the dummy picture and the picture selected by the selection means; and output means for adding a header generated by the header generating means to the encoded data of the dummy picture and outputting the encoded data when the encoding target picture is thinned out.

According to the above invention, while one reference picture is specified in encoded data of the dummy picture, information representing a correspondence relationship between a reference picture for the dummy picture and the picture selected by selection means is set in a header to be added to the dummy picture, and accordingly the dummy picture can refer to a desired picture. In other words, a picture referring to a desired picture in a decoding apparatus can be obtained in accordance with the correspondence relationship.

A prediction residual of each block in the dummy picture may be zero. Also, a motion vector of each block in the dummy picture may be zero. In such a case, the data amount of the dummy picture is reduced.

According to the present invention, since a dummy picture inserted in place of a thinned out picture can refer to a desired picture, the deterioration in image quality when a picture has been thinned out is suppressed. Also, storage area for storing a dummy picture is reduced in a configuration where the dummy picture is prepared in advance and stored in the storage area.

BRIEF DESCRIPTION OF DRAWINGS

FIG. 1 illustrates a thinning out of a picture and a dummy picture;

FIG. 3 illustrates a configuration of a moving picture encoding apparatus according to an embodiment of the present invention;

FIG. 5 illustrates P-picture and B-picture;

FIG. 6A illustrates a reference picture for P-picture;

FIG. 7 illustrates a structure of encoded data generated by an encoding circuit;

FIG. 8 illustrates a data structure of each macroblock;

FIG. 9A illustrates an example of a dummy picture for P-picture;

FIG. 9B illustrates an example of a dummy picture for B-picture;

FIG. 10 is a flowchart explaining operations of a header generating unit;

FIG. 11 illustrates relationships between reference pictures and indexes;

FIG. 13 illustrates a configuration of another embodiment;

FIG. 16 illustrates a configuration of an apparatus for distributing an encoded data stream to a network.

DESCRIPTION OF EMBODIMENTS

FIG. 3 illustrates a configuration of a moving picture encoding apparatus according to an embodiment of the present invention. In this example, the encoding method is H.264. This moving picture encoding apparatus has a function of generating a dummy picture as illustrated in FIG. 1.

Figure 2:
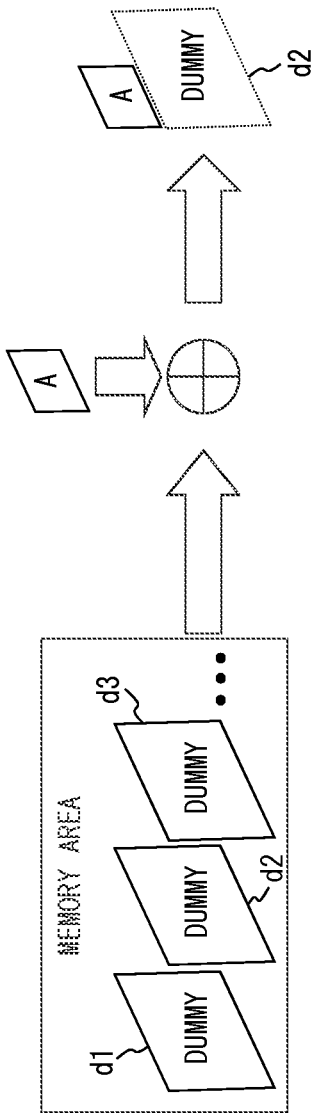
FIG. 2 illustrates a method of inserting a dummy picture in a conventional art.
Figure 4:
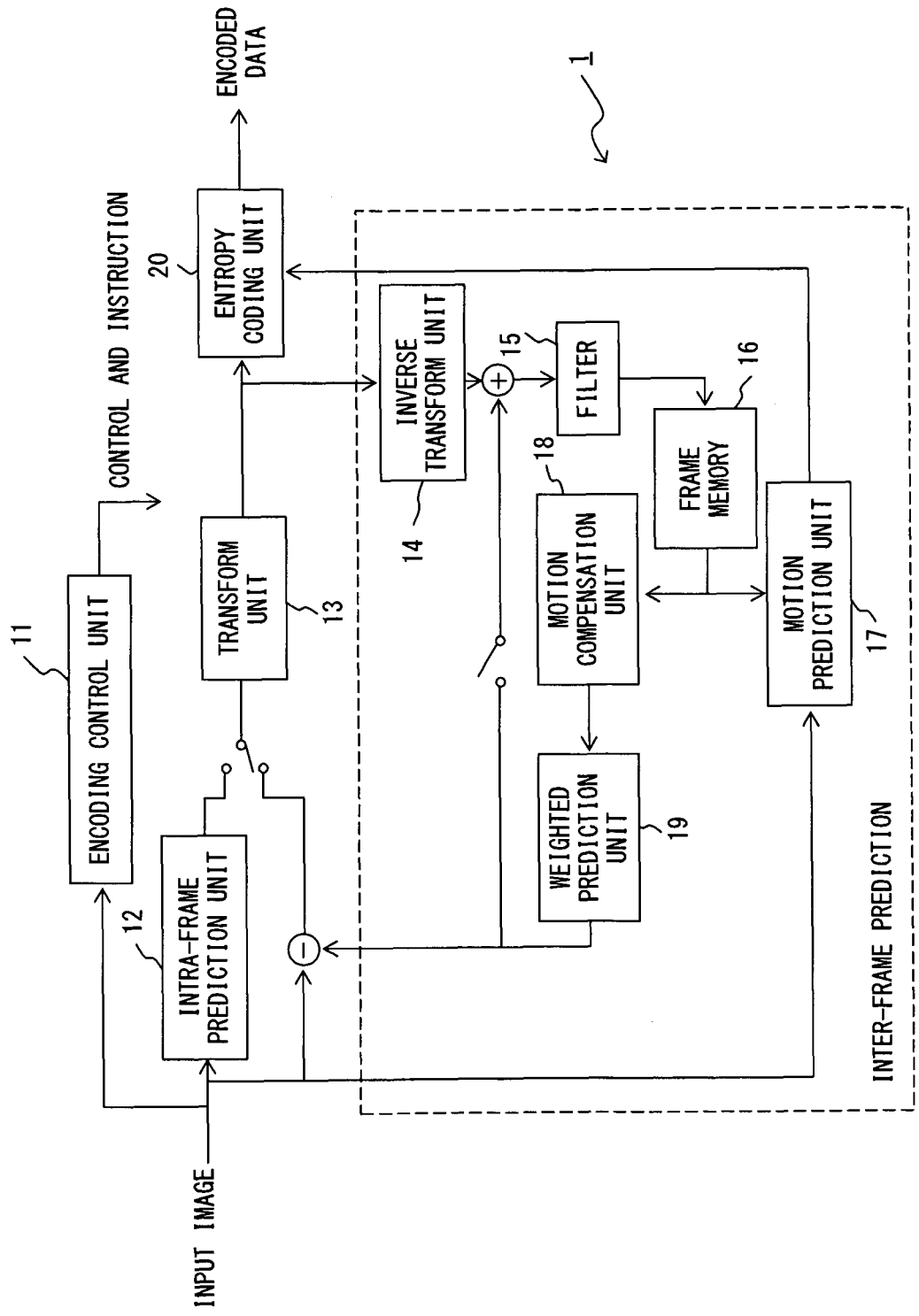
FIG. 4 illustrates a configuration of an encoding circuit.

In FIG. 3, an encoding circuit 1 encodes an input moving picture according to H.264, and outputs the encoded data. The encoding circuit 1 is implemented by a known technique, and a configuration example of the encoding circuit 1 is illustrated in FIG. 4.

An encoding control unit 11 determines an encoding mode for each frame or each block, and gives necessary instructions to respective circuit elements of the encoding circuit 1. An intra-frame prediction unit 12 generates prediction residual data on the basis of a difference between blocks within a frame. A transform unit 13 performs a discrete cosine transform (DCT) on prediction residual data obtained from the intra-frame prediction unit 12 or prediction residual data obtained by an inter-frame prediction which will be explained later in order to transform pixel domain data into frequency domain data. Thereby, DCT coefficient data on a prediction residual is obtained. The transform unit 13 may adopt other transform methods (such as Integer Transform). In addition, the transform unit 13 has a quantization function as well.

An inverse transform unit 14 inversely transforms DCT coefficient data obtained by the transform unit 13. Thereby, pixel domain data before being transformed by the transform unit 13 is obtained. The inverse transform unit 14 has an inverse quantization function as well. A filter 15 is a deblocking filter for reducing block noise. When a P-picture or a B-picture is reconstructed, data output from a weighted prediction unit 19 is also input into the filter 15. A frame memory 16 stores frame data.

A motion prediction unit 17 calculates a motion vector of each block by comparing a frame stored in the frame memory 16 and a newly input frame. A motion compensation unit 18 generates a predicted image on the basis of frame data stored in the frame memory 16 and a motion vector obtained by the motion prediction unit 17. The weighted prediction unit 19 adaptively multiplies the predicted image obtained by the motion compensation unit 18 by a weighting coefficient to adjust the brightness and the like of images. Thereafter, difference information between the input image and a predicted image output from the weighted prediction unit 19 is transferred to the transform unit 13 as prediction residual data of an inter-frame prediction.

An entropy coding unit 20 reduces the information amount of DCT coefficient data obtained by the transform unit 13 and motion vector data obtained by the motion prediction unit 17 by performing entropy coding. As entropy coding, CAVLC (Context-Adaptive Variable Length Coding) or CABAC (Context-Adaptive Binary Arithmetic Coding) may be performed.

In the encoding circuit 1 configured as above, prediction residual data obtained by the intra-frame prediction unit 12 is selected for generating an I-picture (Intra Picture). Prediction residual data obtained by an inter-frame prediction is selected for generating a P-picture (Predictive Picture) or a B-picture (Bi-directional Predictive Picture).

FIG. 5 illustrates P-picture and B-picture. In FIG. 5, five consecutive pictures P1 through P5 are illustrated. For generating P-picture, one arbitrary previous picture is referred to. In the example in FIG. 5, picture P2 is referred to for encoding picture P3. In this case, the motion vector is calculated from pictures P2 and P3. This motion vector is used for generating a predicted image (i.e., P-picture) for picture P3. A decoding apparatus can basically reproduce picture P3 by using picture P2 and the motion vector.

B-picture is generated by referring to one or two pictures. In an example illustrated in FIG. 5, pictures P2 and P4 are referred to for encoding picture P3. In other words, one of the previous pictures and one of the future pictures are referred to. In this case, a motion vector is calculated from pictures P2 and P3, and another motion vector is calculated from pictures P3 and P4. In another example in FIG. 5, pictures P1 and P2 are referred to for encoding picture P3. In other words, two previous pictures are referred to. Additionally, B-picture can also be generated by referring to two future pictures, although this is not illustrated. A predicted image for picture P3 (i.e., B-picture) is generated by using the calculated motion vectors in any of the above cases.

A picture referenceable for generating P-picture or B-picture is determined in advance. For generating P-picture, a previous picture can be referred to. In the example illustrated in FIG. 6A, pictures P1 through P5 can be referred to for encoding picture P6. For generating B-picture, a previous picture and a future picture can be referred to. In the example illustrated in FIG. 6B, pictures P1 through P3, P5 and P6 can be referred to for encoding picture P4. It is assumed that the number of referenceable pictures is determined in advance. The number of referenceable pictures is five each in FIGS. 6A and 6B.

Figure 6B:
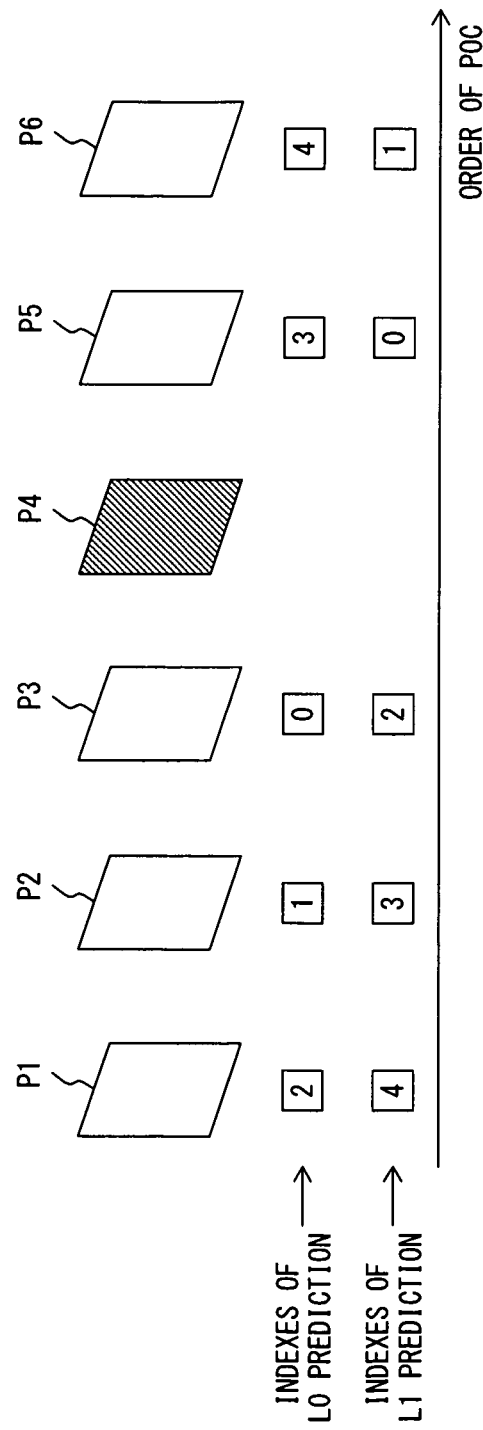
FIG. 6B illustrates a reference picture for B-picture.

A referenceable picture is managed by a "list". On this list, respective referenceable pictures are identified by "reference picture index (ref_idx)". How to assign these reference picture indexes is predetermined as illustrated in FIGS. 6A and 6B. A method of generating encoded data using these reference picture indexes will be explained later.

As described above, B-picture is generated using one or two reference pictures. Accordingly, there can be two lists (L0 and L1) for B-picture. B-picture is basically generated according to L0 prediction, L1 prediction, or bi-predictive. L0 prediction is a unidirectional prediction (mainly a forward prediction) that uses only motion information of L0. L1 prediction is a unidirectional prediction (mainly a backward prediction) that uses only motion information of L1. Bi-predictive uses motion information of L0 and L1.

FIG. 7 illustrates a structure of encoded data generated by the encoding circuit illustrated in FIG. 4. Encoded data includes a sequence header SH and GOP (Group of Pictures). GOP includes a plurality of pictures (e.g., 15 pictures). Each of the pictures includes one or a plurality of slices. A slice is a base unit for encoding, and each of the slices includes a slice header and a plurality of macroblocks MB. According to H.264, each macroblock can be further divided into smaller blocks; however, this division is not described herein. The macroblock MB may be simply called a block hereinafter.

FIG. 8 illustrates a data structure of each of the macroblocks. In FIG. 8, a macroblock type (mb_type) represents a block size of motion compensation and encoding mode. The sizes "16×16" "8×16", "16×8" and "8×8" are prepared as block sizes. As encoding modes, "intra-frame encoding", "L0 prediction", "L1 prediction", "Bi-predictive", and "direct mode" are provided. A reference picture index (ref_idx) is used for identifying a reference picture. For P-picture, one reference picture index is set, and for B-picture, one or two reference picture indexes are set. Reference pictures are represented by reference picture indexes as illustrated in FIG. 6A or 6B. For example, when picture P3 is referred to in the L0 prediction in the example illustrated in FIG. 6B, ref_idx__0 is set to "0" (zero) as a reference picture index ("ref_idx__0=0"). When pictures P2 and P3 are referred to respectively in the L0 and L1 predictions in Bi-predictive, ref_idx__0 and ref_idx__1 are respectively set to "1" and "2" as reference picture indexes ("ref_idx__0=1" and "ref_idx__1=2").

Motion vector (mv) represents a motion vector corresponding to each reference picture. CBP (Coded Block Pattern) represents whether or not there is effective DCT coefficient. DCT coefficient is DCT coefficient data obtained by the transform unit 13. The DCT coefficient is encoded data of prediction residual. Skip flag identifies whether to execute a skipped macroblock which will be described later.

As described above, the encoded data of each block basically includes reference picture index data, motion vector data, and DCT coefficient data. According to H.264, generally, each block can refer to a different picture. That is, a value corresponding to each of the blocks is written as the reference picture index.

FIG. 3 is again explained. A thinning-out decision unit 2 determines whether or not a picture needs to be thinned out. When the bit rate of encoded data exceeds the capacity of a transmission system or the amount of processing for real-time encoding exceeds the capacity of an encoding apparatus, it is determined that a picture needs to be thinned out. A selection unit 3 is controlled by the determination of the thinning-out decision unit 2. Specifically, the selection unit 3 selects encoded data obtained by the encoding circuit 1 when a picture is not thinned out, and selects dummy data, which will be described later, when a picture is thinned out. The selected data (encoded data or dummy data) is output with additional information as necessary. Additional information is, for example, character information.

A dummy picture storage device 4 stores one dummy picture for P-picture and one dummy picture for B-picture. These dummy pictures are generated in advance and are stored in the dummy picture storage device 4, for example. The dummy picture is not pixel data, but encoded data of a dummy picture of P-picture or B-picture.

FIG. 9A illustrates an example of a dummy picture for P-picture. In this example, data for one slice is illustrated. It is assumed that the slice data includes k macroblocks. Note that a skip flag is omitted.

The dummy picture includes MB type data, reference picture index data, motion vector data, and CBP data. MB type data for all the blocks has a value of "0". With respect to P-picture, "MB type=0(P_L0__16×16)" represents that the block type is "16×16" and the encoding mode is the L0 prediction. Reference type index data for all the blocks has a value of "0". "Reference picture index=0" represents that an immediately previous picture of the encoding target picture is referred to. In other words, all the blocks refer to the same picture. Motion vector data of all the blocks has a value of "0". "Motion vector=0" represents that the corresponding blocks in a reference picture are copied without being moved. CBP data for all the blocks has a value of "0000". "CBP=0000" represents that DCT coefficient is "0". Thus, DCT coefficient data is not added in any of the blocks.

FIG. 9B illustrates an example of a dummy picture for B-picture. The dummy picture for B-picture is basically the same as the dummy picture for P-picture. However, in the dummy picture for B-picture, MB type data for all the blocks has a value of "1". With respect to B-picture, "MB type=1 (B_L0__16×16)" represents that the block type is "16×16" and the encoding mode is the L0 prediction.

As described above, all the blocks in the dummy picture refer to the same picture. Here, the reference picture is a picture identified by "reference picture index=0". In addition, the motion vectors of all the blocks are "0". Further, the DCT coefficients of prediction residual of all the blocks are also "0". Therefore, this dummy picture substantially corresponds to information indicating that a picture same as the picture identified by "reference picture index=0" is reproduced. In other words, when a decoder reproduce the dummy picture, a picture same as the picture identified by "reference picture index=0" is obtained.

Note that the data length of a binary data sequence is shorter when the reference picture index is "0" than when the reference picture index is other value. Also, the data length of a binary data sequence is shorter when the motion vector is zero than when the motion vector is not zero. Further, the dummy picture does not contain DCT coefficient data. Accordingly, an amount of information of the dummy picture is smaller than that of general P-picture or B-picture.

FIG. 3 is again explained. A reference picture selection unit 5 selects a reference picture from among a plurality of referenceable pictures. As a reference picture, a picture that, for example, can bring the smoothest possible moving picture for viewers when decoded is selected on the basis of the encoding target picture and referenceable pictures. In addition, the reference picture selection unit 5 may be implemented using a function of the encoding control unit 11 illustrated in FIG. 4.

A list generating unit 6 generates list information representing relationship between a reference picture selected by the reference picture selection unit 5 and a reference picture for a dummy picture stored in the dummy picture storage device 4. A reference picture for the dummy picture stored in the dummy picture storage device 4 is specified by "reference picture index=0". For example, when the reference picture index of a reference picture selected by the reference picture selection unit 5 is "0", list information "0/0" is generated, and when the reference picture index of a reference picture selected by the reference picture selection unit 5 is "1", list information "0/1" is generated.

A header generating unit 7 generates a header to be added to a dummy picture. A "header" is control information necessary for decoding encoded data. However, information directly relating to operations of a moving picture encoding apparatus according to an embodiment is mainly a slice header.

FIG. 10 is a flowchart explaining operations of the header generating unit 7. The processes in this flowchart are executed for example when the thinning-out decision unit 2 determines that a picture should be thinned out. Alternatively, these processes may be executed each time the encoding circuit 1 encodes each of the pictures.

In step S1, a default header is generated. A default header is a slice header in which the most standard predetermined values are. A default header may be generated also by known encoding circuits. That is, the encoding circuit 1 can also generate a default header in the example illustrated in FIG. 3. In such a case, thus, the header generating unit 7 may obtain a default header from the encoding circuit 1. The codes contained in a slice header are described below.

> first_mb_in_slice
> slice_type
> pic_parameter_set_id
> frame_num
> field_pic_flag
> bottom_field_flag
> idr_pic_id
> pic_order_cnt_lsd
> delta_pic_order_cntZ_bottom
> delta_pic_order_cnt
> redundant_pic_cnt
> direct_spatial_mv_pred_flag
> num_ref_idx_active_override_flag
> num_ref_idx_l0_active_minus1
> num_ref_idx_l1_active_minus1
> ref_pic_list_reordering( )
> pred_weight_table( )
> dec_ref_marking( )
> cabac_init_idc
> slice_qp_delta
> sp_for_switch_flag
> slice_qs_delta
> disable_deblocking_filter_idc
> slice_alpha_c0_offset_div2
> slice_beta_offset_div2
> slice_group_change_cycle In step S2, a maximum reference index value is set in order to specify the number of referenceable pictures. Specifically, "num_ref_idx_active_override_flag" is set to "1". This makes it possible to update "num_ref_idx_l0_active_minus1" and "num ref_idx_l1_active_minus1". Then, "num ref_idx_l0_active_minus1" is set to "0". Similarly, "num ref_idx_l1_active_minus1" is also set to "0". Thereby, the number of referenceable pictures on the lists L0 and L1 is limited to one, respectively.

In step S3, list information is obtained from the list generating unit 6. In step S4, it is checked whether or not the reference picture index of the reference picture selected by the reference picture selection unit 5 is "0". When the index is "0", since it can be considered that the picture referred to by the dummy picture and the picture selected by the reference picture selection unit 5 are identical, the process in step S5 is skipped. When the index is not "0", the process in step S5 is executed so that the picture referred to by the dummy picture and the picture selected by the reference picture selection unit 5 become identical.

In step S5, "ref_pic_list_reordering( )" is used to reorder the indexes on the reference picture list. An example of reordering indexes will be explained by referring to FIG. 11.

In this example, picture P3 among consecutive pictures P1 through P5 is encoded, as illustrated in FIG. 11. As an encoding mode, the L0 prediction is set in MB type data of a dummy picture. Accordingly, in this case, "1", "0", "3", and "4" have been assigned to the reference indexes of pictures P1, P2, P4, and P5, respectively.

In the above situation, the reference picture selection unit 5 selects a picture to be referred to by the encoding target picture. In the example illustrated in FIG. 11, picture P1 is selected as a picture to be referred to by picture P3. Here, "1" is assigned to the reference picture index of picture P1. The reference picture index set in the dummy picture is "0". Accordingly, if the dummy picture with the slice header that is not updated is decoded, picture P2 will be obtained.

Thus, the header generating unit 7 assigns the selected picture P1 to the reference picture index set in the dummy picture as illustrated in FIG. 11. In other words, the header generating unit 7 reorders the indexes on the reference picture list by using "ref_pic_list_reordering( )" in the slice header. Specifically, picture P1 is assigned to the reference picture index "0".

Figure 12:
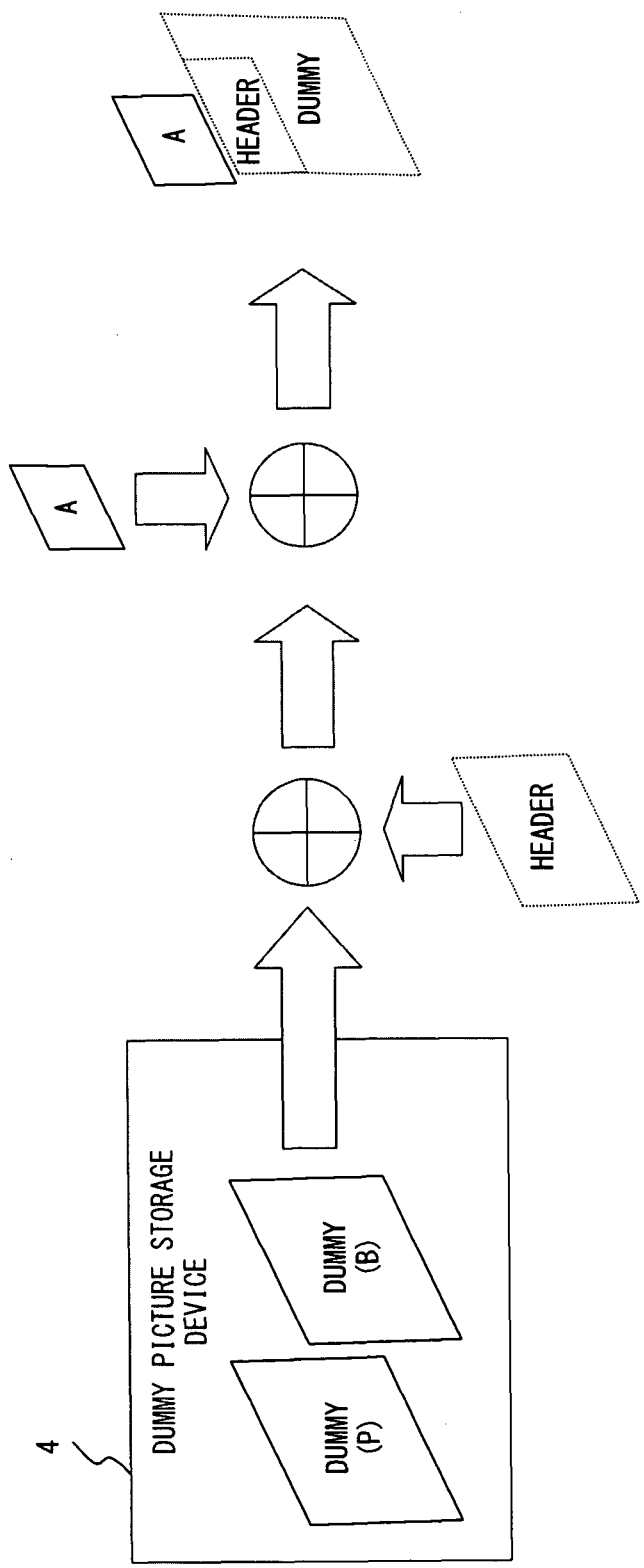
FIG. 12 illustrates entire operations of a moving picture encoding apparatus according to an embodiment.

In step S6, the generated slice header is output. This slice header is added to a dummy picture extracted by the dummy picture storage device 4 as illustrated in FIG. 12. Upon this extraction, a dummy picture for P-picture is extracted if P-picture has been thinned out, and a dummy picture for B-picture is extracted if B-picture has been thinned out. Additional information A is further added to the extracted dummy picture, and that dummy picture is output as encoded data of the moving picture. The moving picture decoding apparatus having received this encoded data separates the additional information A from the dummy picture, and reproduces the original picture using the header information.

As describe above, in the moving picture encoding apparatus according to an embodiment, a dummy picture is output when an arbitrary picture is thinned out. The output dummy picture refers to a picture specified by a prescribed reference picture index ("0" in the example). However, reference relationships of the reference picture indexes can be changed in a header added to the dummy picture as described above. In other words, a dummy picture can arbitrarily refer to a desired picture. Therefore, a dummy picture can refer to a picture that can bring the smoothest possible moving picture for viewers when decoded. As a result, a picture that can realize the smoothest possible moving picture for viewers is output instead of a dummy picture, resulting in better reproduction of a moving picture.

Further, while the moving picture encoding apparatus according to an embodiment is configured to enable a dummy picture to refer to a desired picture, only one dummy picture for P-picture and one dummy picture for B-picture are stored in advance in the dummy picture storage device 4 as illustrated in FIG. 12. Thus, a storage area for storing dummy pictures is reduced.

Other Embodiment 1

In the embodiment illustrated in FIG. 3, a dummy picture is generated beforehand and stored in a storage device. In the embodiment in FIG. 13, by contrast, a dummy picture generating unit 11 generates and outputs a dummy picture when a picture is thinned out. Dummy pictures generated by the dummy picture generating unit 11 are the same as those stored in the dummy picture storage device 4 in the embodiment illustrated in FIG. 3. This configuration can reduce a storage area in a moving picture encoding apparatus.

Other Embodiment 2

Figure 14A:
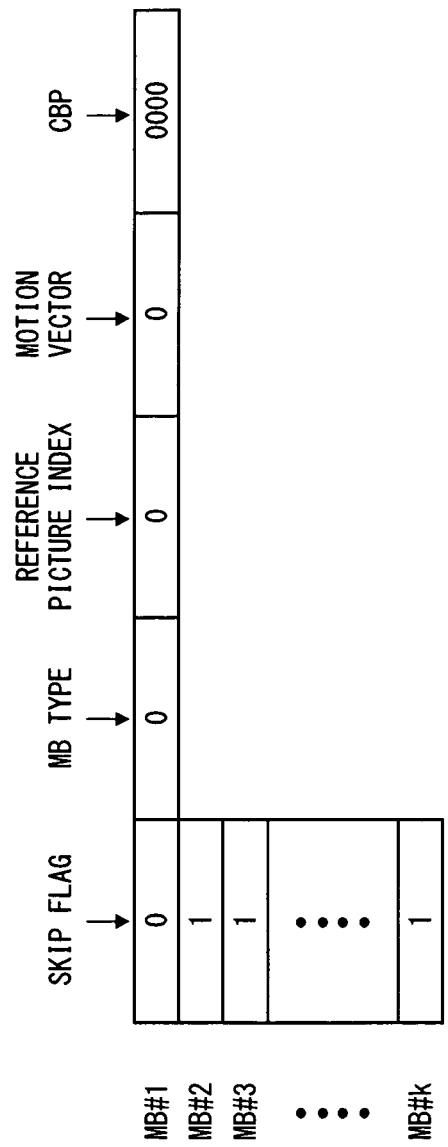
FIG. 14A illustrates an example of a dummy picture for P-picture according to the other embodiment.
Figure 14B:
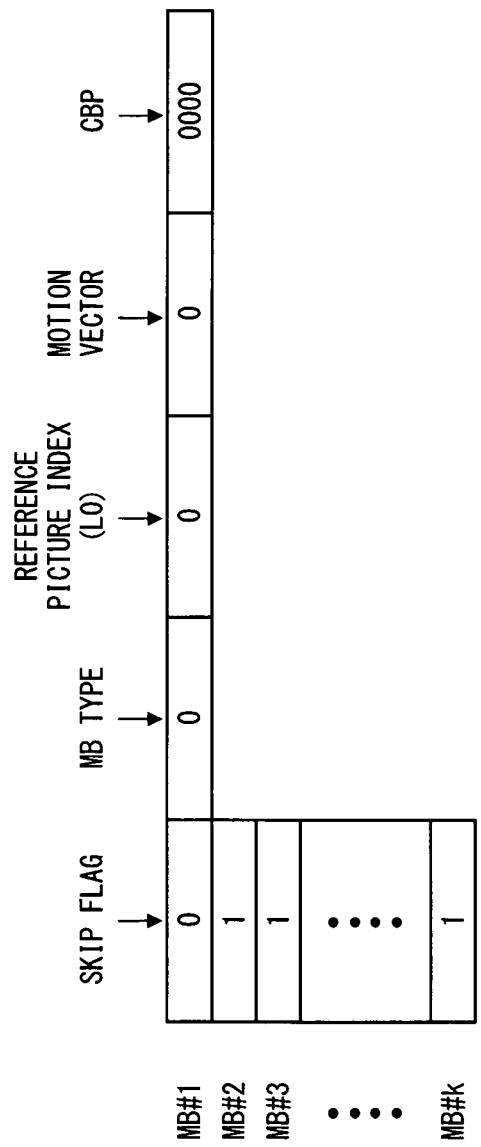
FIG. 14B illustrates an example of a dummy picture for B-picture according to the other embodiment.

FIGS. 14A and 14B illustrate examples of dummy pictures according to another embodiment. FIG. 14A illustrates an example of a dummy picture for P-picture, and FIG. 14B illustrates an example of a dummy picture for B-picture.

The first block in a dummy picture in this embodiment is basically the same as those in dummy pictures illustrated in FIGS. 9A and 9B. Specifically, the reference picture index is set to "0" and the motion vector is also set to "0". Also, there is no DCT coefficient data. However, "MB type=0(B_Direct_16×16)" is set in a dummy picture for B-picture as illustrated in FIG. 14B in order to specify the direct mode.

The direct mode is an encoding mode in which motion information of an encoding target block is generated on the basis of the prediction of motion information of another block which has previously been encoded. H.264 defines the temporal direct mode and the spatial direct mode. In this embodiment, the spatial direct mode is specified in a slice header, which will be explained later.

In the second and subsequent blocks, skip flags are set. Specifically, the skipped macroblock (skip_MB) is specified in each of the second and subsequent blocks. The skipped macroblock is an operation mode in which the information on a particular block is not transmitted and the decoding apparatus uses the information on a block in a reference picture at a position corresponding to that particular block. In this case, the second and subsequent blocks refer to the same picture as the first block, and the information on the blocks in the reference picture at the positions corresponding to the second and the subsequent blocks is copied.

The default setting in H.264 applies the bi-directional prediction to a block for which the skipped macroblock mode is specified, and a predicted picture is obtained from the average of the immediately previous picture and immediately following picture. However, in the moving picture encoding according to an embodiment, only one reference picture is referred to by a dummy picture. That is, it is restricted that all blocks refer to same picture. Accordingly, as above, only one reference picture index (L0 in this example) is specified in the first block. Thereby, the subsequent skipped-macroblock specified blocks refer to the same picture as the first block, and all the blocks refer to the same one picture.

Additionally, according to H.264, when the temporal direct mode is selected as a direct mode, the motion vector of a skipped-macroblock specified block depends upon the vector of the reference picture of L1 (reference list for the backward direction). In such a case, there is a probability that the vector of an encoding target block will become non-zero. Thus, moving picture encoding in an embodiment adopts the spatial direct mode as a direct mode. In the spatial direct mode, the vector of each block is calculated from the motion vectors of adjacent blocks in the same picture. Accordingly, when the motion vector of the first block is zero, the motion vectors of the subsequent skipped-macroblock specified blocks are the same as that of the first block, resulting in the motion vectors of all the blocks being zero. The spatial direct mode is selected as a direct mode by setting "direct_spatial_mv_pred_flag" to "1".

As described above, this embodiment adopts the skipped macroblock mode and the spatial direct mode, and thereby greatly reduces the information amount of encoded data of a dummy picture. As a result, the storage area for storing a dummy picture is reduced.

Other Embodiment 3

In the moving picture encoding apparatus illustrated in FIG. 3, the reference picture selection unit 5 selects a picture closest to the picture to be thinned out in time domain. An example will be explained by referring to FIG. 15. In the example illustrated in FIG. 15, each frame includes a top picture and a bottom picture. For example, picture P3 (Top) and picture P3 (Btm) are a set of pictures to form one frame. The top picture is made of the top fields of an interlaced image, and the bottom picture is made of the bottom fields of the interlaced image.

Figure 15:
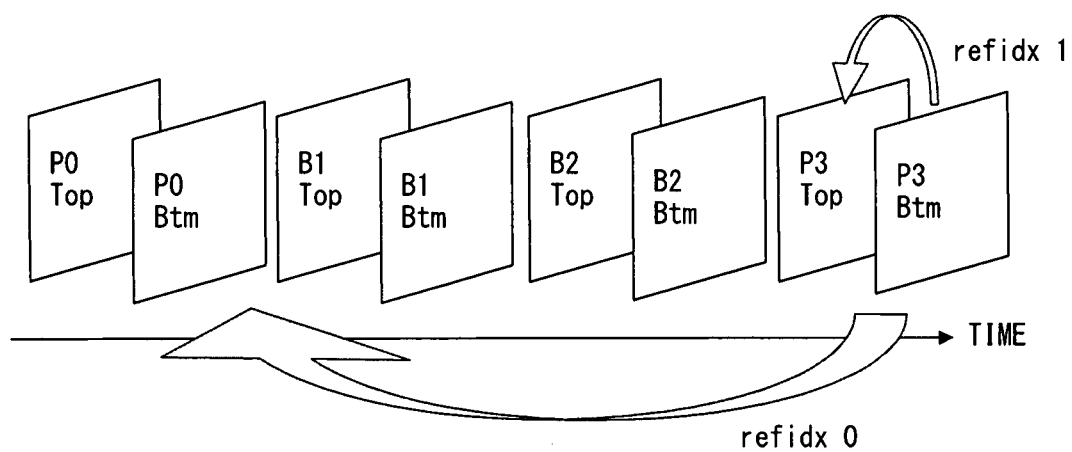
FIG. 15 illustrates list status of reference pictures.

It is assumed that picture P3 (Btm) is thinned out in FIG. 15. The picture closest to picture P3 (Btm) in time domain is picture P3 (Top). Accordingly, the reference picture selection unit 5 selects picture P3 (Top) as a reference picture for the dummy picture.

If picture P3 (Top) is not a referenceable picture when picture P3 (Btm) is thinned out, there are two pictures closest to picture P3 (Btm) in time domain, i.e., pictures P2 (Top) and P2 (Btm). In such a case, the reference picture selection unit 5 selects a picture having the same field (top or bottom) as that of the picture to be thinned out. Specifically, picture P2 (Btm) is selected as a reference picture of the dummy picture for picture P3 (Btm).

The moving picture encoding apparatus according to an embodiment prepares dummy data beforehand, and the reference picture index is set to "0". Accordingly, when the reference picture index of the picture selected as above is different from that of the dummy picture, the correspondence relationship has to be defined using "ref_pic_list_reordering( )" in the slice header.

Other Embodiment 4

FIG. 16 illustrates a configuration of an apparatus for distributing an encoded data stream to a network. An encoded data stream in this example is a H.264 stream, which is obtained by encoding a moving picture according to H.264. The configurations and operations of the dummy picture storage device 4, the reference picture selection unit 5, the list generating unit 6, and the header generating unit 7 are as explained by referring to FIG. 3. In this distribution apparatus, a picture is thinned out when the bit rate of an encoded data stream exceeds the transfer rate of a network.

A header analysis unit 21 analyzes the NAL (Network Abstraction Layer) in the H.264 stream. The NAL header includes information (nal_ref_idc) representing whether each picture is a reference picture or a non-reference picture. The header analysis unit 21 instructs that the picture thinning-out process should be executed when it is determined that a picture needs to be thinned out and that the picture is a non-reference picture. The operations of the picture thinning-out process are similar to those of the moving picture encoding apparatus explained by referring to FIG. 3.

The header analysis unit 21 has a function of extracting a slice header (and slice data) from an encoded data stream so as to analyze it. This function detects referenceable pictures for a picture to be thinned out. The reference picture selection unit 5 selects a reference picture from among the detected referenceable pictures. The header generating unit 7 generates a slice header to be added to a dummy picture on the basis of the slice header extracted by the header analysis unit 21 or by updating the slice header extracted by the header analysis unit 21.

As described above, when a picture needs to be thinned out in this distribution apparatus, a picture that can be replaced with a dummy picture is a non-reference picture. Thus, the quality of image that is obtained by decoding the encoded data is improved.

Example 1

A dummy picture is generated under conditions 1 through 4 described below.

```
condition 1: SliceQPy=51
condition 2: num_refl0_active_idx_minus1=0
condition 3: num_refl1_active_idx_minus1=0
condition 4: cabac_init_idc=0
```

Both X and Y components of the motion vector of each block are zero.
Only L0 is a reference picture list for each block.
A reference picture index (ref_idx) for each block is "0".
A DCT coefficient is zero.

Information on a slice header added to the above dummy picture is as described below.

```
SliceQPy=51
Direct_mv_spatial_flag=1
num_refl0_active_idx_minus1=0
num_refl1_active_idx_minus1=0
cabac_init_idc=0
```

The picture closest to the picture to be thinned out in time domain is assigned to "ref_idx0" on list L0 by using "ref_pic_list_reordering( )".

The invention claimed is:

1. A moving picture encoding apparatus for encoding a moving picture utilizing motion compensation, the moving picture encoding apparatus comprising:
a storage configured to store encoded data of a dummy picture in which each block has the same index to identify a picture to be referred to by the dummy picture;
a selector configured to select a picture to be referred to by an encoding target picture from among a plurality of referenceable pictures that can be referred to by the encoding target picture;
a header generator configured to generate a header including a reference picture list in which indexes to respectively identify the plurality of referenceable pictures are listed in a specified order; and
output means for adding the header generated by the header generator to the encoded data of the dummy picture and outputting the encoded data when the encoding target picture is thinned out, wherein
when the index to identify the picture selected by the selector is different from the index to identify the picture to be referred to by the dummy picture, the header generator reorders the indexes in the reference picture list such that the index to identify the picture to be referred to by the dummy picture is allocated to the picture selected by the selector.

2. The moving picture encoding apparatus according to claim 1, wherein:
a prediction residual of each block in the dummy picture is zero.

3. The moving picture encoding apparatus according to claim 1, wherein:
a motion vector of each block in the dummy picture is zero.

4. The moving picture encoding apparatus according to claim 1, wherein:
a reference picture is specified in a prescribed number of blocks including a first block in the dummy picture; and
in other blocks in the dummy picture, information instructing them to take over information specified for the prescribed number of blocks is set.

5. The moving picture encoding apparatus according to claim 4, wherein:
the moving picture encoding apparatus adopts H.264 as an encoding method; and
the header generator sets information specifying a spatial direct mode as an encoding mode in the header.

6. The moving picture encoding apparatus according to claim 1, wherein:
the moving picture encoding apparatus adopts H.264 as an encoding method; and
"0" is set as a reference picture index specifying a reference picture in each block in the dummy picture.

7. The moving picture encoding apparatus according to claim 1, wherein:
the selector selects a picture closest to an encoding target picture to be thinned-out in time domain as a picture to be referred to by the encoding target picture.

8. The moving picture encoding apparatus according to claim 7, wherein:
the moving picture encoding apparatus is configured to encode each of a plurality of pictures obtained from each frame constituting a moving picture; and
the selector selects a picture having a same field as a field of an encoding target picture to be thinned-out when there are two or more pictures closest to the encoding target picture in time domain.

9. The moving picture encoding apparatus according to claim 1, wherein
the selector selects the picture so as to obtain the smoothest moving picture when decoded based on the encoding target picture and the selected picture.

10. A moving picture encoding method of encoding a moving picture utilizing motion compensation, the method comprising:
preparing encoded data of a dummy picture in which each block has the same index to identify a picture to be referred to by the dummy picture;
selecting a picture to be referred to by an encoding target picture from among a plurality of referenceable pictures that can be referred to by the encoding target picture;
generating a header including a reference picture list in which indexes to respectively identify the plurality of referenceable pictures are listed in a specified order; and
adding the generated header to the encoded data of the dummy picture and outputting the encoded data when the encoding target picture is thinned out, wherein
when the index to identify the selected picture is different from the index to identify the picture to be referred to by the dummy picture, the indexes in the reference picture list are reordered such that the index to identify the picture to be referred to by the dummy picture is allocated to the selected picture.

* * * * *